Figure 1:
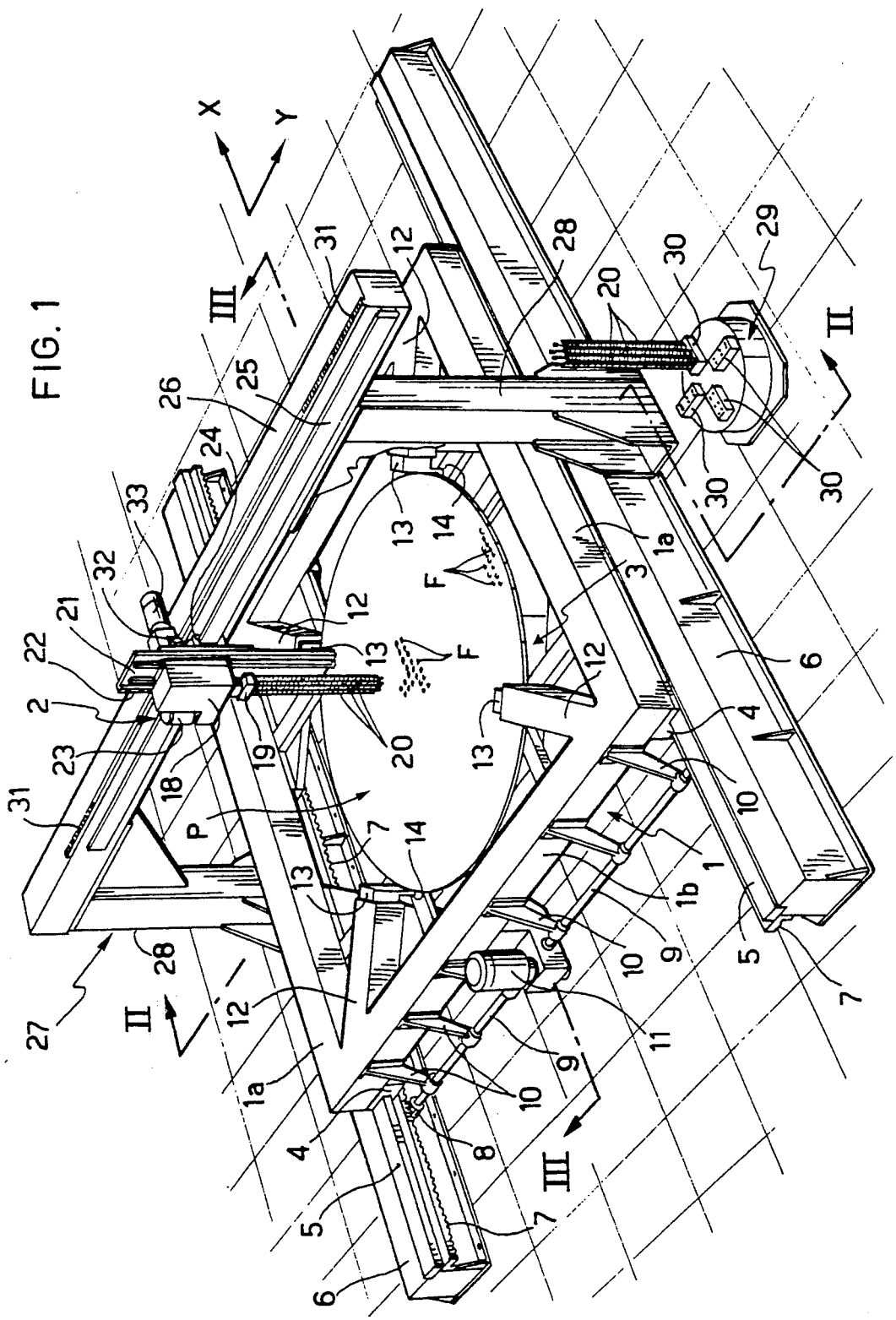

United States Patent [19]
Varinelli et al.

[11] Patent Number: 5,184,985
[45] Date of Patent: Feb. 9, 1993

[54] VERTICAL BROACHING MACHINE WITH MULTIPLE BROACHES

[75] Inventors: Antonio Varinelli; Marco Varinelli, both of Milan; Oreste Bianco, Caselette, all of Italy

[73] Assignee: Officine Meccaniche Varinelli SpA, Milan, Italy

[21] Appl. No.: 904,133

[22] Filed: Jun. 25, 1992

[30] Foreign Application Priority Data

Jun. 25, 1991 [EP] European Pat. Off. ........ 91830281.1

[51] Int. Cl.$^5$ ................ B23Q 3/155; B23D 41/00
[52] U.S. Cl. ................................. 483/28; 409/265; 409/272
[58] Field of Search ........... 409/264, 265, 266, 267, 409/268, 269, 287, 286, 272, 273, 270; 483/28, 29

[56] References Cited

U.S. PATENT DOCUMENTS 3,526,956  9/1970  Fulks ............................ 483/28 X
4,367,992  1/1983  Soroka .......................... 409/264

FOREIGN PATENT DOCUMENTS 3134038  3/1983  Fed. Rep. of Germany ........ 483/28
3728412  3/1989  Fed. Rep. of Germany ........ 483/28
3929055  3/1991  Fed. Rep. of Germany ........ 483/29
2376717  1/1977  France ........................... 409/272
1421480  9/1988  U.S.S.R. ......................... 483/28

Primary Examiner—William Briggs
Attorney, Agent, or Firm—Sughrue, Mion, Zinn, Macpeak & Seas

[57] ABSTRACT

A vertical broaching machine with multiple broaches, particularly for forming tube plates for steam generators, includes a support for supporting a perforated plate in a horizontal position, a broach-holder disposed above the support and movable vertically relative thereto, a pulling unit for the broaches which is disposed below the support and movable vertically relative thereto in alignment with the broach-holder, and means for causing relative movements of the plate and the broaches along two mutually perpendicular horizontal axes in order to align the broaches vertically with successive holes in the plate. The support for the plate is movable along only one of the perpendicular axes and the broach-holder and the pulling unit are movable along the other horizontal axis.

5 Claims, 5 Drawing Sheets

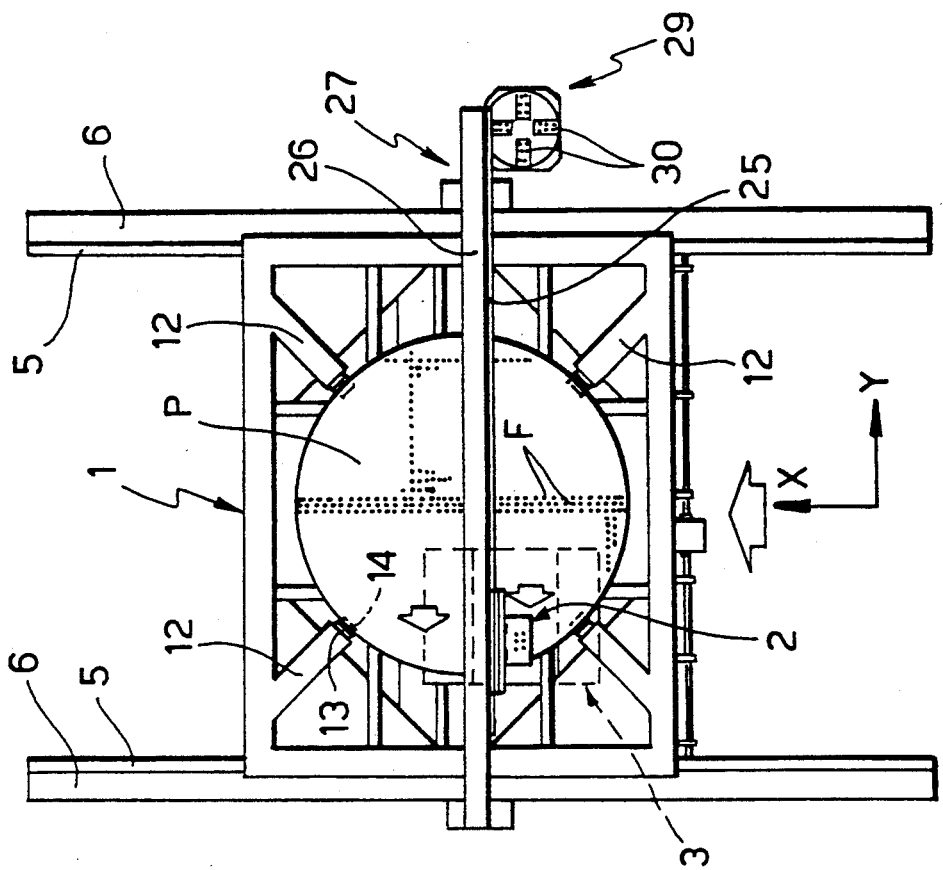
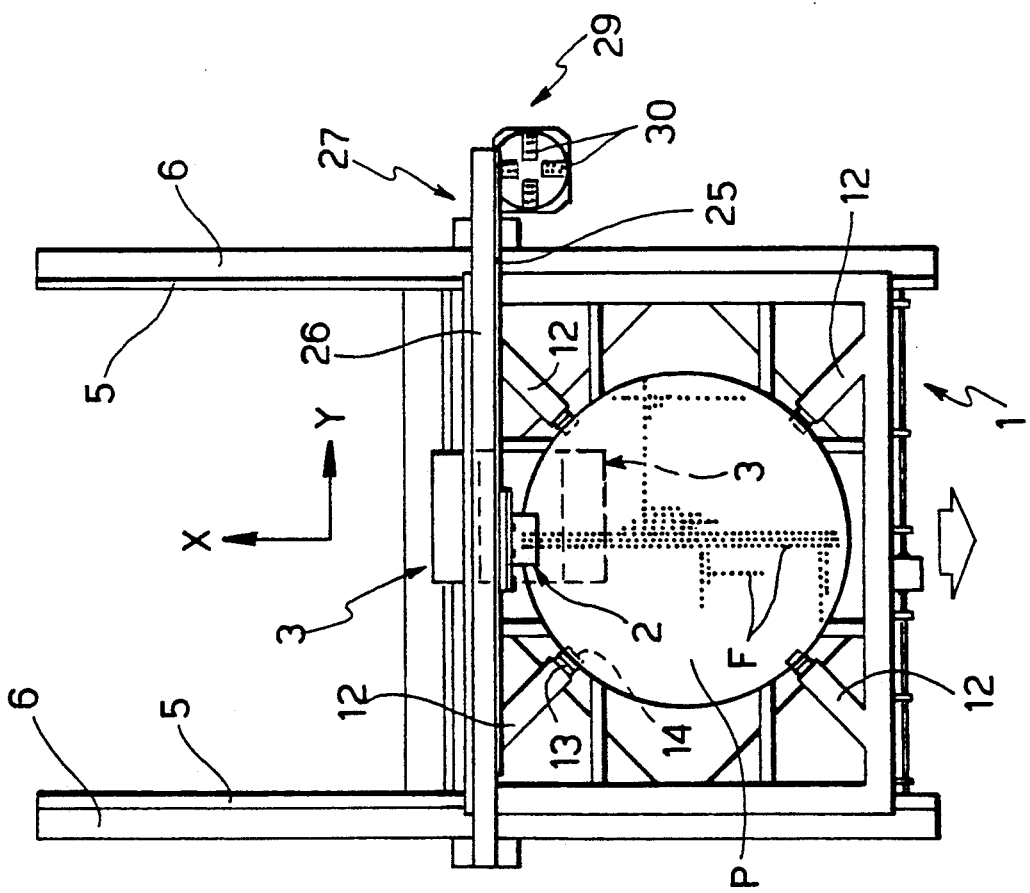

VERTICAL BROACHING MACHINE WITH MULTIPLE BROACHES

DESCRIPTION

The present invention relates in general to vertical broaching machines.

More specifically, the invention relates to a vertical broaching machine with multiple broaches, particularly for forming tube plates for steam generators and similar applications, including a support for supporting a perforated plate in a horizontal position, a broach-holder disposed above the support for the plate and movable vertically relative thereto, a pulling unit for the broaches which is disposed below the support and movable vertically relative thereto in alignment with the broach-holder, and means for causing relative movements of the plate and the broaches along two mutually perpendicular horizontal axes in order to align the broaches vertically with successive holes in the plate.

A vertical broaching machine of this type is known from FR-A-2,376,717 in which the relative movements along the two horizontal axes are achieved by a plate support constituted by a roller table which is movable longitudinally along a trolley which in turn is movable transversely. The broach-holder is supported by a swan-neck structure which projects above the plate support and can move only vertically, and the pulling unit below the plate support can similarly move only vertically.

In practice, therefore, both the longitudinal and transverse movements which are necessary in order to carry out the broaching are imparted to the perforated plate which means that a large amount of space must be available around the machine with a complete absence of obstacles in the regions in which the plate is positioned from time to time during working.

The object of the present invention is to avoid this problem and to provide a vertical broaching machine with multiple broaches of the type defined at the beginning which requires considerably less space in which to operate.

According to the invention, this object is achieved by virtue of the fact that the support for the plate is movable along only one horizontal axis and the broach-holder and the pulling unit are movable along the other horizontal axis.

According to a preferred embodiment of the invention, the plate support is supported for sliding along two longitudinal guides parallel to the first axis and has first drive means for moving it along the longitudinal guides. The broach-holder is supported for sliding along a portal structure arranged transversely above the longitudinal guides and has second drive means for moving it along the portal structure, and the pulling unit is supported for sliding along a pair of transverse guides arranged below the plate support in a position substantially corresponding to that of the portal structure and has third drive means for moving it along the transverse guides.

To advantage, the plate support is constituted by a quadrangular frame with four diagonal, horizontal arms of adjustable length projecting inwardly from its corners to support the perforated plate.

In order that small plates can be worked, the support also includes, to advantage, an auxiliary frame which can be supported within the frame and has respective internal horizontal arms of adjustable length for supporting a small perforated plate.

According to another aspect of the invention, the broaching machine also includes a broach store beside the support, and the portal structure along which the broach-holder is movable extends over the broach store.

Figure 2:
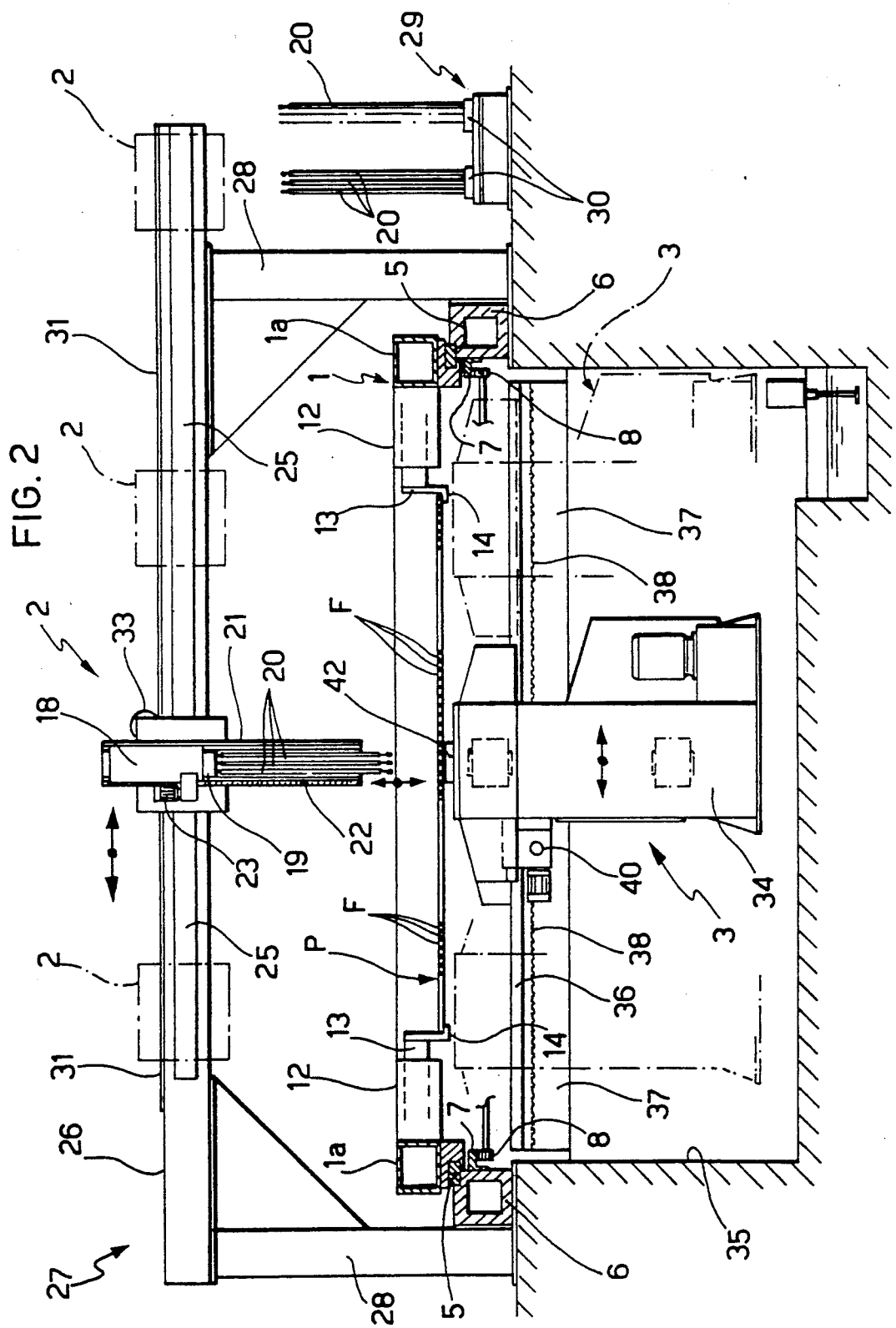
Figure 3:
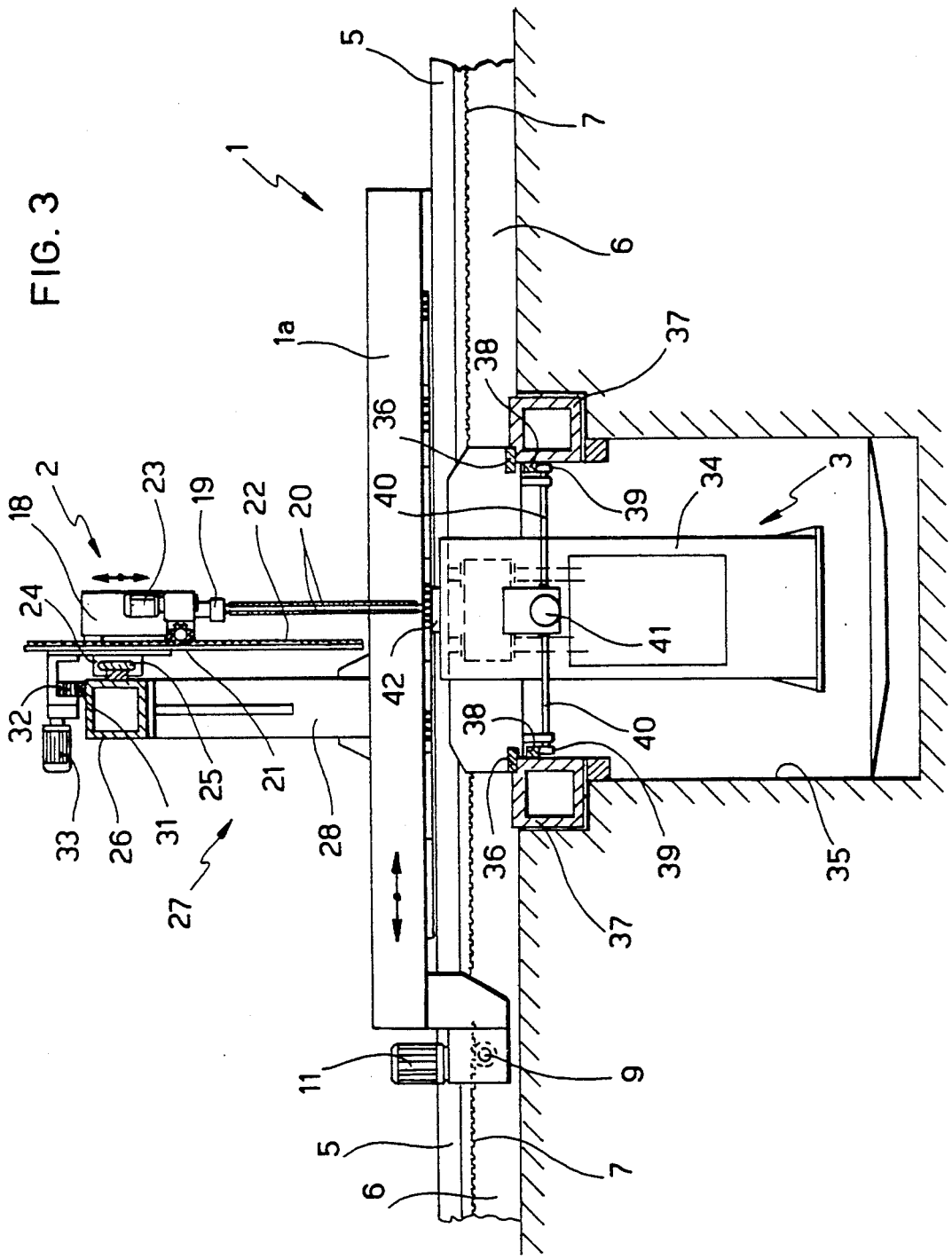
Figure 4:
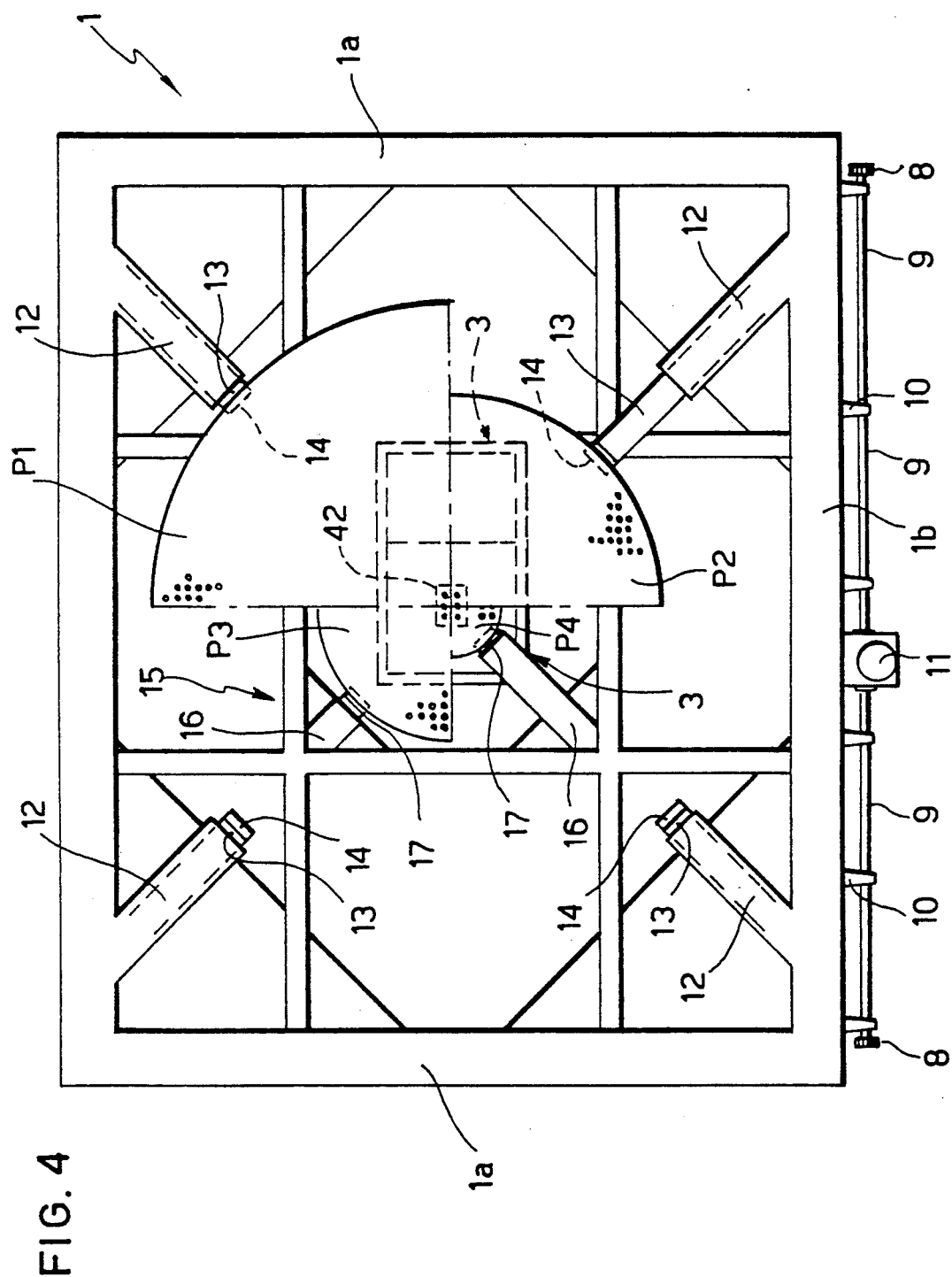

Further characteristics and advantages of the invention will become clear in the course of the detailed description which follows with reference to the appended drawings, provided purely by way of non-limiting example, in which:

FIG. 1 is a schematic perspective view of a vertical broaching machine with multiple broaches according to the invention, FIG. 2 is a vertical, transverse section taken on the line II—II of FIG. 1, FIG. 3 is a vertical, longitudinal section taken on the line III—III of FIG. 1, FIG. 4 is a plan view of the plate support showing various ways in which it can be used, and FIGS. 5 and 6 are two schematic plan views of the broaching machine in operation.

With reference initially to FIGS. 1 to 3, these show a vertical broaching machine particularly for forming grooved holes in a circular plate P which has a plurality of circular holes F arranged in lines and columns and is intended, for example, to constitute a tube plate for a steam generator.

The broaching machine comprises essentially a support 1 for supporting the plate P, a broach-holder 2 above the support 1 and a unit 3 below the support 1 for pulling the broaches.

The support 1 is constituted by a quadrangular frame, beneath two opposite sides 1a of which are two tracks, 4 engaged for sliding along two parallel guides 5 carried by respective beams 6 arranged parallel to the longitudinal axis, indicated X in the drawings, of the broaching machine.

Below each longitudinal guide 5 is a respective longitudinal rack 7 meshed with a sprocket 8 carried by one end of a shaft 9 which is supported rotatably on one of the other sides 1b of the frame 1 by means of brackets 10. The inner ends of the shafts 9 are rotated by an electric or hydraulic motor 11 which is also supported externally on the side 1b.

The corners of the frame 1 carry four diagonal, tubular arms 12 which project horizontally inwardly thereof. A respective support 13 with a support foot 14 at its end is slidable telescopically in each arm 12. The feet 14 define four bases for retaining the plate P and their radial positions can easily be adjusted in dependence on the diameter of the plate P simply by sliding the supports 13 telescopically relative to the tubular arms 12. The sliding may even be mechanised by means of motor-driven actuators which are not shown but are within the capabilities of an expert in the art.

The upper right-hand portion of FIG. 4 shows a support 13 fully retracted into its arm 12 in a position corresponding to the maximum permitted diameter (normally of the order of 6 metres) of the plate, indicated $P_1$, to be worked. The lower right-hand portion of the same drawing, however, shows a support 13 in its fully extended position which corresponds to the smallest diameter of a plate, indicated $P_2$, which can be worked on the support 1. The machine can operate even with plates P of smaller diameter, however, and for this purpose has an auxiliary frame 15, also quadrangular, which can be supported within the structure of the frame 1 and has its own extensible arms 16 with support feet 17 similar to the feet 14, for use with small plates. The upper left-hand portion of FIG. 4 shows an arm 16 in its fully retracted position for supporting a plate $P_3$ with the maximum small diameter and the lower left-hand portion of the same drawing shows an arm 16 in its fully extended position for supporting a plate $P_4$ with the minimum small diameter.

The support 1 can thus be moved only along the longitudinal axis X of the machine in two opposite directions along the guides 5 by the operation of motors 11. According to the invention, the movement along the transverse axis Y is imparted to the broach-holder 2 and to the pulling unit 3 in the manner described below.

The broach-holder 2 is constituted, in generally known manner, by a body 18 with a lower attachment device 19 in which the top shanks of a set of vertical broaches 20, of which there are six in the embodiment illustrated, are releasably engaged. The attachment device 19 is not shown in detail since it is of generally conventional type.

The body 18 is movable vertically along a vertical guide 21 which has a vertical rack 22 meshed with a sprocket (not shown) which is rotated by a motor 23 supported by the same body 18.

The rear of the vertical guide 21 in turn has a guide 24 engaged for sliding along a horizontal guide 25 carried by a horizontal cross member 26 which forms part of a portal structure 27. The portal structure 27 includes two vertical uprights 28 which are fixed externally to central regions of the longitudinal beams 6, and to the tops of which the cross member 26 is fixed.

The cross member 26 projects a certain distance beyond a respective upright 28 over a rotary store 29 with a series of supports 30 each of which is adapted to support a set of six broaches 20 which are interchangeable with those carried by the broach-holder 2.

A horizontal rack 31 fitted to the upper side of the cross member 26 meshes with a sprocket 32 which is rotated by a motor 33 carried by the vertical guide 21.

With the structure described above, the broach-holder 2 can move in opposite directions along the cross member 26, that is, along a transverse axis Y, relative to the support 1 and hence to the plate P supported thereon. When the broaches 20 need to be replaced, the unit 2 is moved to the end of the cross member 26 which projects over the rotary store 29 so that the broaches 20 can be released and a new set of broaches 20 picked up after a corresponding rotation of the store 29.

The pulling unit 3 can also move along the transverse axis Y in synchronism with similar movements of the broach-holder unit 2. For this purpose the pulling unit 3, which is of generally known type and for brevity will not therefore be described in detail, includes a block 34 in a pit 35 below the support 1 and between the two longitudinal beams 6. The block 34 has a pair of sliding blocks 36 which are engaged for sliding on two transverse guides 37 arranged along the upper edges of the pit 35 substantially on opposite sides of the upper portal structure 27. Two racks 38 are associated with the two guides 37 and mesh with two sprockets 39 carried by respective opposed shafts 40 which are rotated by a motor 41 carried by the block 34.

The pulling unit 3 also includes an upper, central, perforated plate 42 for supporting the region of the plate P which is being broached at any particular time.

As explained above, the broach-holder 2 and the pulling unit 3 are moved along the transverse axis Y by the synchronised operation of their motors 33 and 41 in a manner which is within the capabilities of an expert in the art.

FIGS. 5 and 6 show, by way of example, the operation of the broaching machine according to the invention. After the plate P has been positioned on the feet 14 of the supports 13 and the support 1 has been positioned at one end of its travel along the axis X, the holes F are broached in groups of six, arranged in rows along the axis X, the vertical guide 21 with the broach-holder 2 on the portal 27 and the pulling unit 3 being kept vertically aligned and stationary on the axis Y, and the support 1 being moved in successive steps along the axis X. At the end of each step in the movement of the support 1, the broach-holder 2 is lowered along the vertical guide 21 by the motor 23 so as to place the bottom shanks of the broaches 20 through the six holes F in the plate P which are aligned therewith. The bottom shanks pass through the upper support plate 42 and are gripped by the pulling unit 34 in known manner and are pulled downwardly thereby, passing through the plate P and broaching the six holes. The broaches 20 are then placed, by suitable combined movements of the pulling unit 2 along the axis Y and possibly of the support 1 along the axis X, in a region which is accessible by the broach-holder 2 from above so that the latter can pick them up again and carry them back above the plate P which is then advanced by a further step (FIG. 5). Upon completion of the broaching of the three rows of holes F along the entire length of the plate P along the axis X, the broach-holder unit 2 is moved along the portal 27 by one step along the axis Y by means of the motor 33 and the pulling unit 3 is correspondingly moved by the same distance in the same direction so as to be realigned with the broach-holder 2 (FIG. 6) and the cycle is repeated in the same manner with the support 1 moving in successive steps along the axis X until the broaching of a further three rows of holes F has been completed along the entire length of the plate P along the axis X. The cycle proceeds in the same manner until the broaching of all the holes F is completed, after which the support 1 is repositioned at one end of its travel along the axis X to enable the plate P to be removed and a new plate to be positioned on the feet 14. If the broaches 20 have to be replaced for dressing during the working, the broach-holder 2 is moved to the end of the cross member 26 which projects over the rotary store 29 and they are exchanged for new broaches 20 in the manner described above.

The cycle of the machine is carried out completely automatically with the aid of a control system of the type which is usual in the machine tools field, for controlling the motors 11, 23, 33 and 41 in a synchronised manner as explained above.

Naturally, the details of construction and forms of embodiment of the broaching machine may be varied widely with respect to those described and illustrated, without thereby departing from the scope of the present invention.

What is claimed is:

1. A vertical broaching machine with multiple broaches particularly for forming tube plates for steam generators, including a support for supporting a perforated plate in a horizontal position, a broach-holder disposed above the support for the plate and movable vertically relative thereto, a pulling unit for the broaches which is disposed below the support and movable vertically relative thereto in alignment with the broach-holder, and means for causing relative movements of the plate and the broaches along two mutually perpendicular horizontal axes in order to align the broaches vertically with successive holes in the plate, wherein the support for the plate is movable along only one horizontal axis and the broach-holder and the pulling unit are movable along the other horizontal axis.

2. A broaching machine according to claim 1, further comprising two longitudinal guides parallel to the first axis along which the said support is supported for sliding, first drive means for moving the said support along the longitudinal guides, a portal structure arranged transversely above the longitudinal guides and along which the broach-holder is supported for sliding, second drive means for moving the broach-holder along the portal structure, a pair of transverse guides arranged below the support in a position substantially corresponding to that of the portal structure, and along which the pulling unit is supported for sliding, and third motor-driven means for moving the said pulling unit along the transverse guides.

3. A broaching machine according to claim 2, wherein the support for the plate is constituted by a quadrangular frame with four diagonal, horizontal arms of adjustable length projecting inwardly from its corners to support the plate.

4. A broaching machine according to claim 3, wherein the support also includes an auxiliary frame which is supported in the frame and has respective internal horizontal arms of adjustable length for supporting small perforated plates.

5. A broaching machine according to claim 2, wherein it also includes a broach store beside the support, and in that one end of the portal structure extends over the broach store.

* * * * *